Oct. 21, 1924.
V. JAKOB ET AL
BUMPER BAR HANGER
Filed Jan. 8, 1924
1,512,770
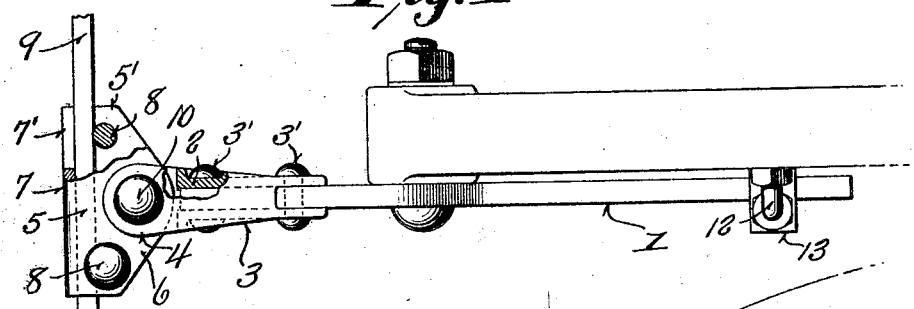
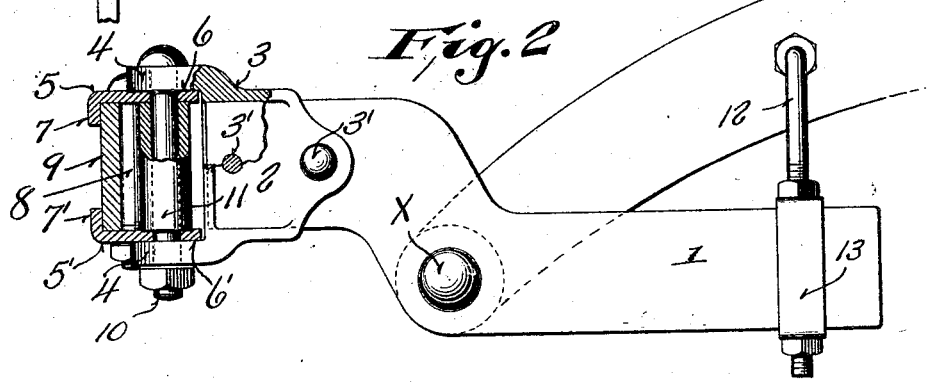
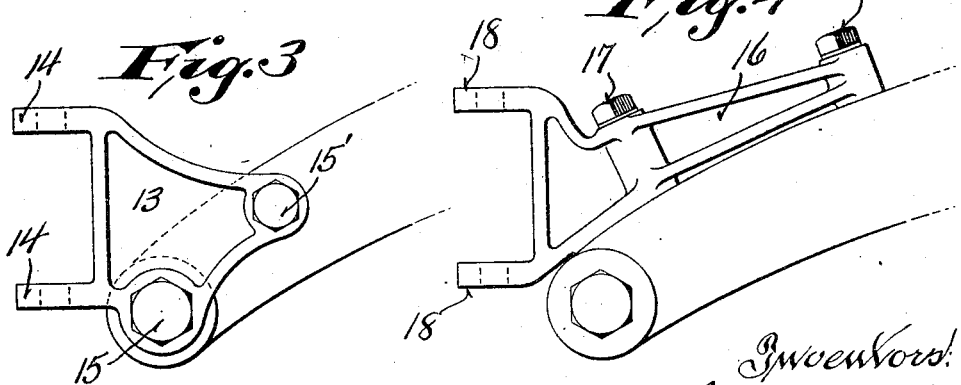

Patented Oct. 21, 1924.

1,512,770

UNITED STATES PATENT OFFICE.

VICTOR JAKOB AND GEORGE L. PEDERSON, OF RACINE, WISCONSIN.

BUMPER-BAR HANGER.

Application filed January 8, 1924. Serial No. 634,951.

*To all whom it may concern:*

Be it known that we, VICTOR JAKOB, a citizen of Germany, and GEORGE L. PEDERSON, a citizen of the United States, and both residents of Racine, in the county of Racine and State of Wisconsin, have invented certain new and useful Improvements in Bumper-Bar Hangers; and we do hereby declare that the following is a full, clear, and exact description thereof.

Our invention refers to bumper bar hangers, and it has for its primary object to provide a bumper bar hanger having a yoke head adapted to receive companion bumper bar clamping members.

Another object of our invention is to provide a hanger having a yoke head formed with a socketed body and forwardly extended apertured ears for the reception of a two-part bumper bar clamp capable of oscillation upon a king bolt seated in the apertured ears of the yoke head, together with means in connection with the oscillatory clamp parts for securing them together and for maintaining the bumper bar against transverse thrust in either direction.

With the above and other minor objects in view, the invention consists in certain peculiarities of construction and combination of parts, as will be hereinafter fully set forth with reference to the accompanying drawings and subsequently claimed.

In the drawings:

Figure 1 is a plan view of the same with parts broken away and other parts in section, to more clearly illustrate structural features.

Figure 2 represents a side elevation of a bumper bar hanger embodying the features of our invention, the same being shown associated with a spring bumper bar element, with parts in section and parts broken away to more clearly illustrate details of construction.

Figure 3 is a side elevation of another form of our invention, the same showing parts constituting the hanger, to wit, the thrust arm and yoke head formed in one piece and attached to the side face of a frame-horn, and Figure 4 is a similar elevation of still another form of our invention, showing a one piece yoke and thrust arm for the hanger bar attached to the upper face of a frame-horn.

While this invention may be employed in connection with various types of bumper bars, it is particularly developed for attaching bumper bars, such as disclosed in our allowed application for patent for improvements in automobile bumpers, Serial No. 636,296, filed May 3, 1923, and allowed September 24, 1923, and it is also obvious that while it is particularly adapted for spring bumper bars, it may be used in connection with any type of bumper wherein a strap element is used and arranged to be anchored to the frame of a vehicle.

Referring to the drawings which illustrate certain exemplifications of our invention, in spring bumpers it has been found by actual test that it is highly desirable that localization of strains at the point of attachment of the bumper to the frame members of the vehicle be prevented. This is accomplished by the construction illustrating certain exemplifications of our invention.

Referring particularly to the drawings, the hanger comprises a thrust arm 1 adapted to be secured in any suitable manner to the frame-horn of the vehicle. The outer end of the thrust arm is fitted into the socketed body 2 of a yoke head 3. The socketed body of the yoke head is secured to the end of the thrust arm by means of rivets or bolts 3'. The yoke head has forwardly extended apertured ears 4, which ears serve as hangers for the oscillatory bumper bar clamp, the same comprising upper and lower jaw members 5—5' respectively. These jaw members are formed with rearwardly extended, centrally apertured flanges 6—6' and inturned outer lips 7—7'. The flanges of the bumper bar clamp are also provided with alined pairs of apertures for the reception of grip and thrust bolts 8—8, which thrust bolts, in addition to anchoring the jaws of the clamp together, also confine a bumper bar 9 against horizontal movement with relation to its clamping members.

The oscillatory bumper bar clamp is pivotally mounted between the ears of the yoke head by means of a king bolt 10, which king bolt is preferably retained by a suitable nut and spring washer. The king bolt also passes through a spacing thimble 11, the end edges of which thimble abut the opposite faces of the flanges 6—6' of the clamp, whereby the distance between the same is maintained and this king bolt construction thus permits ready oscillation of the bumper when the same is submitted to shock strain.

The friction connection between the bumper bar and the oscillatory clamp also permit longitudinal play of said bumper to accommodate the flexion of the same under functioning conditions.

From the foregoing description it will be seen that a simple, economical and effective hanger mechanism is the result of the construction just explained, it being in some instances particularly desirable to construct the hanger thrust arm and yoke head in two parts, whereby cheapness in manufacture and durability is assured, while at the same time the assembled unit will meet with all the requirements demanded in such structures.

In the above referred to exemplification of our invention the thrust arm is particularly desirable, in certain instances, for attachment to the frame-horn, whereby the hanger may be adjusted upon the spring bolt X for proper alinement and elevation, the adjustment being maintained by a bolt 12 which is secured to the frame-horn rearwardly of its front end, and which bolt is connected to the rear end of the thrust arm by a suitable clamp 13. These parts, however, constitute no element of our present invention.

Referring now more particularly to Figures 3 and 4, we have illustrated in Figure 3 a one-piece hanger mechanism, wherein the shank or thrust arm is readily bolted to a side face of the frame-horn, it being of course understood that the yoke head 13 in this case has projecting apertured ears 14 cast out in one-piece. In this form suitable bolts 15—15' are utilized for securing the hanger to the side face of the frame-horn.

Referring to Figure 4, the thrust arm 16 of the hanger is arranged to be fitted to the top face of the horn to which it is secured by suitable bolts 17, the jaw portion having the extended ears 18, being similar in construction to the form just explained and illustrated in Figure 3 of the drawings. For simplicity in illustration we have not incorporated the oscillatory clamp member and associated parts of the bumper bar in these modified forms of hanger.

While we have shown and described certain exemplifications of our invention minutely as to details, it is understood that the structural features so described may be varied within the scope of the claims.

We claim:—

1. A hanger for bumper bars comprising a thrust arm adapted to be secured to the frame of a vehicle, a yoke head extending from the forward end of the thrust arm, the same being provided with apertured ears; the combination of an oscillatory bumper bar clamp for engagement with the edges of a bumper bar, the clamp including jaw members having rearwardly disposed apertured flanges fitted between the yoke head ears, and outer inturned lips for overlapping engagement with the edges of the bumper bar, a king bolt extending through the yoke head ears and clamp flanges, and bolts extending through the clamp flanges upon opposite sides of the king bolt for drawing said clamp flanges together, the same constituting friction or gripping means associated with the lips of the clamp jaw members for securing the bumper bar against horizontal movement.

2. A hanger for bumper bars comprising a thrust arm adapted to be secured to the frame-horn of a vehicle, a yoke head formed with projecting apertured ears and a socketed body engaging the front end of the thrust arm, and means for securing the body to said thrust arm; the combination of an oscillatory bumper bar clamp for frictionally engaging the edges of a bumper bar, the clamp including jaw members having rearwardly disposed apertured flanges fitted between the yoke head ears, outer inturned lips overlapping the edges of the bumper bar, a king bolt extending through the yoke head ears and flanges of the clamp members, and bolts extending through the clamp flanges upon opposite sides of the king bolt for drawing said clamp flanges together, the same constituting friction or gripping means associated with the lips of the clamp jaw members for securing the bumper bar against horizontal movement.

3. A hanger for bumper bars comprising a thrust arm adapted to be secured to the frame-horn of a vehicle, a yoke head formed with projecting apertured ears and a socketed body engaging the front end of the thrust arm, and means for securing the body to said thrust arm; the combination of an oscillatory bumper bar clamp for frictionally engaging the edges of a bumper bar, the clamp including jaw members having rearwardly disposed apertured flanges fitted between the yoke head ears, outer inturned lips overlapping the edges of the bumper bar, a spacing thimble for the bolt interposed between the clamping jaw members, clamping flanges, and bolts extending through the clamp flanges upon opposite sides of the king bolt for drawing said clamp flanges together, the same constituting friction or gripping means associated with the lips of the clamp jaw members for securing the bumper bar against horizontal movement.

In testimony that we claim the foregoing we have hereunto set our hands at Racine, in the county of Racine and State of Wisconsin.

VICTOR JAKOB.
GEO. L. PEDERSON.